United States Patent [19]

Bonniot

[11] Patent Number: 5,067,316

[45] Date of Patent: Nov. 26, 1991

[54] ROCKET ENGINE EXPANSION NOZZLE WITH COMPLEMENTARY ANNULAR NOZZLE

[75] Inventor: Claude E. Bonniot, Gisors, France

[73] Assignee: Societe Europeene De Propulsion, Suresnes, France

[21] Appl. No.: 437,201

[22] Filed: Nov. 16, 1989

[30] Foreign Application Priority Data

Nov. 21, 1988 [FR] France ................. 88 15122

[51] Int. Cl.[5] ................. F02K 11/00; B63H 25/46
[52] U.S. Cl. ................. 60/263; 60/271; 239/265.23; 239/424.5
[58] Field of Search ............ 60/271, 263, 264, 265, 60/269; 239/127.3, 265.15, 265.23, 424.5, 558, 559

[56] References Cited

U.S. PATENT DOCUMENTS

| | | | |
|---|---|---|---|
| 3,000,178 | 9/1961 | Logerot | 239/265.23 |
| 3,013,384 | 12/1961 | Smith | 60/264 |
| 3,121,457 | 2/1964 | Whipple | 239/424.5 |
| 4,004,416 | 1/1977 | Amelio | 60/264 |
| 4,242,865 | 1/1981 | Harrison | 239/265.15 |
| 4,489,889 | 12/1984 | Inman | 60/271 |
| 4,592,509 | 6/1986 | Moss | 239/425.5 |
| 4,947,644 | 8/1990 | Hermant | 60/271 |

Primary Examiner—Louis J. Casaregola
Assistant Examiner—John A. Savio, III
Attorney, Agent, or Firm—Bacon & Thomas

[57] ABSTRACT

The invention comprises an expansion nozzle for a rocket engine destined to function successively in atmospheric and space conditions. The nozzle is comprised of a main wall defining a surface of revolution that splays outwardly and further comprises a complementary annular convergent divergent nozzle having an exhaust port and also having its axis coinciding with the principal axis of the main wall. The complementary annular nozzle is located outside the main wall and has a gas distribution torus cooperating with gas flow supply means to produce an annular flow of gas surrounding a main flow of gas exhausted at the down stream extremity of said main wall of the expansion nozzle. The annular flow of gas forms a source of static pressure $P_s$ that is substantially lower than atmospheric pressure $P_a$. $P_s$ has a value of between 0.3 and 0.8 times $P_a$.

30 Claims, 3 Drawing Sheets

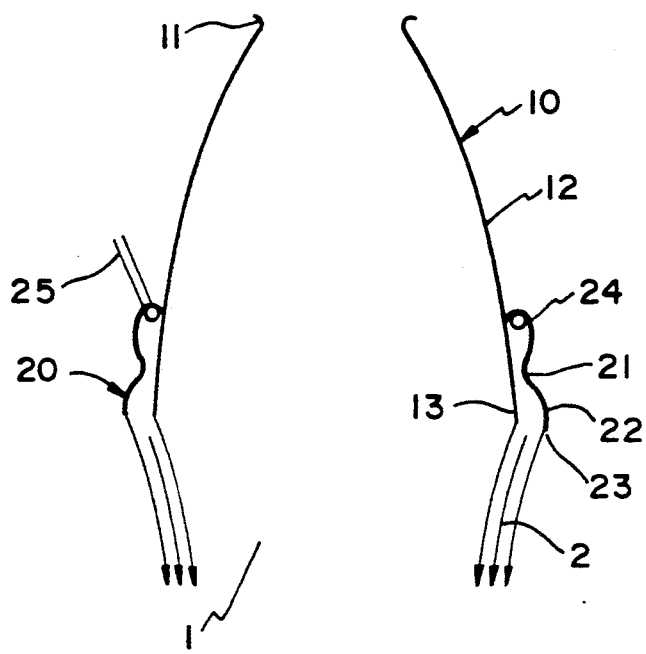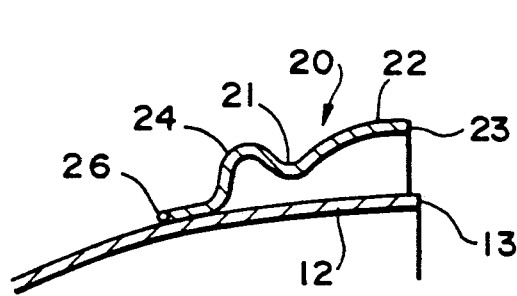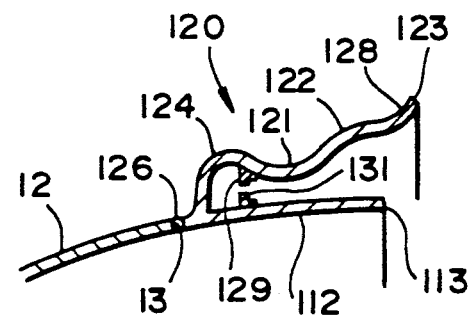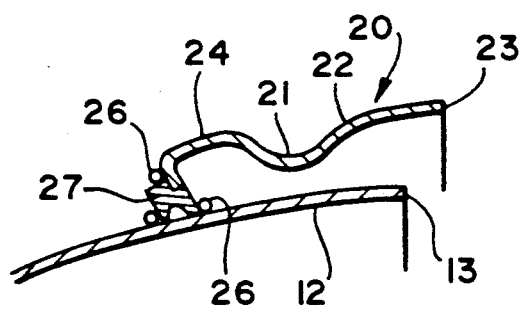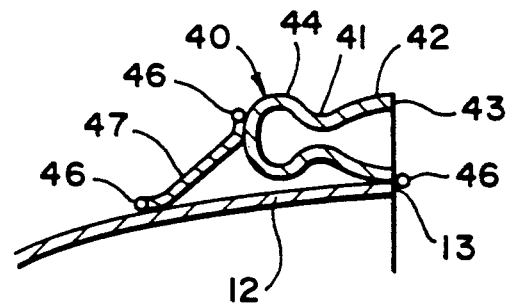
FIG. 1
FIG. 2
FIG. 4
FIG. 3
FIG. 5

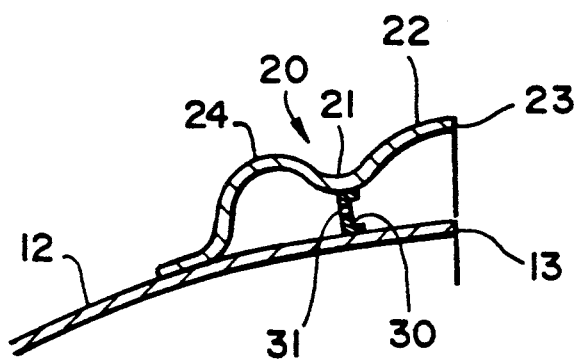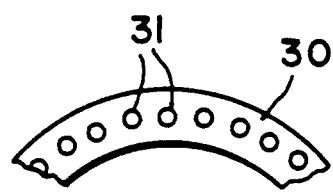
FIG. 9   FIG. 9A
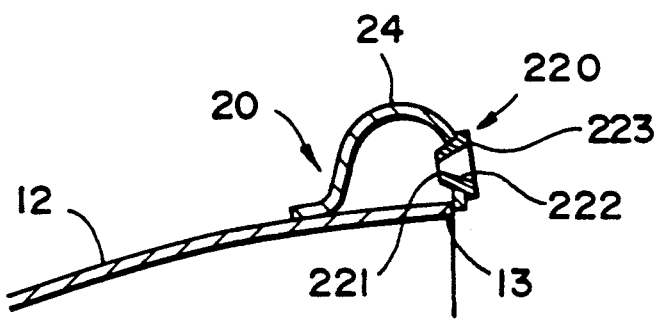
FIG. 10
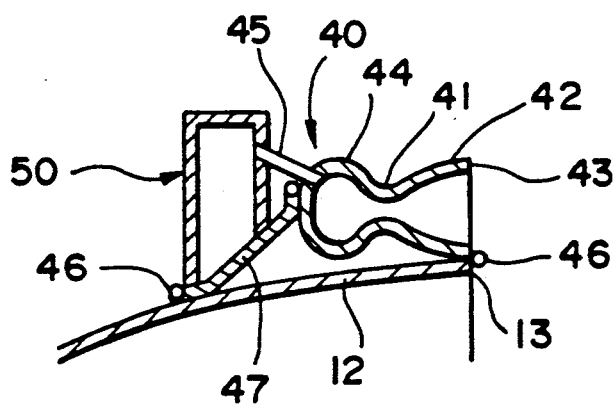
FIG. 12

ROCKET ENGINE EXPANSION NOZZLE WITH COMPLEMENTARY ANNULAR NOZZLE

BACKGROUND OF THE INVENTION

1. Field of the Invention

The present invention generally relates to an expansion nozzle for a rocket engine required to function successively under atmospheric and space conditions, and more particularly relates to an expansion nozzle comprised of a main wall defining a surface of revolution that splays outwardly between a nozzle throat and a downstream extremity of said nozzle.

2. Background of the Invention

In rocket engines, an expansion nozzle is the part of the rocket engine's main nozzle that serves to transform the energy produced in the combustion chamber into an impulsive force by transforming the potential energy contained in combustion gases under pressure into kinetic energy. The efficiency of this transformation process improves as the pressure drop in the expansion nozzle increases. The pressure drop is determined by the ratio between the flow section at the expansion nozzle's exhaust port and to the flow section at the throat section of the main nozzle.

For engines operating at ground level, i.e. with an atmospheric pressure of around one bar, or in the presence of a counter-pressure, the above pressure drop is limited by the condition of burble-free flow of the gas jet in the expansion nozzle, which imposes a minimum value Pe/Pa for the ratio between the pressure Pe exerted on flow-containing walls by the exhausted gases and atmospheric pressure Pa. Known rocket engine exhaust nozzles for ground level operation have flow sections that are limited by the above burbling effect. As a consequence, they give relatively poor performance at altitude.

The object of the present invention is to increase the pressure drop obtainable by an expansion nozzle having to operate at ground level or in the presence of a counter pressure by means of an easily installable device.

SUMMARY OF THE INVENTION

The above object is achieved by an expansion nozzle for a rocket engine destined to function successively in atmospheric and space conditions, comprised of a main wall defining a surface of revolution that splays outwardly between a nozzle throat and a downstream extremity of said expansion nozzle, wherein said expansion nozzle is further comprised of a complementary annular convergent and divergent nozzle of small vertical extent and having an axis coinciding with the principal axis of said main wall, said complementary annular nozzle being located outside said main wall in the region of said downstream extremity of said expansion nozzle and comprising a gas distribution torus cooperating with gas flow supply means to produce an annular flow of gas exhausted from the diverging part of said complementary annular nozzle, said annular flow of gas surrounding a main flow of gas exhausted at said downstream extremity of said main wall of said expansion nozzle and forming a source of static pressure Ps that is substantially lower than atmospheric pressure Pa and having a value of between 0.3 and 0.8 times atmospheric pressure Pa.

The annular nozzle produces an exhaust flow whose static pressure is less than the ambient pressure surrounding the main gas jet, creating therewith an interface having a pressure that is lower than ambient pressure Pa, thereby enabling an increase in the pressure drop and in the allowable flow section ratio without burbling.

The pressure acting on the wall at the exhaust end of the main nozzle can in principle be decreased by 60% falling from 0.4 bar to 0.16 bar, so granting the possibility of increasing the pressure drop and improving the specific impulse in space conditions.

A variety of embodiments can be accomodated by the invention.

Advantageously, the gas distributor torus is prolonged at its lower part by a shrunken portion serving as a flow converger for the complementary annular nozzle.

The lower extremity of the external wall of the complementary annular nozzle is prolonged by a generally concave deflector whose concavity is turned towards the outside.

The gas distribution torus has internal partitions for improving gas distribution uniformity.

According to a specific embodiment, the throat of the complementary annular nozzle is closed by a plate that is provided with a succession of holes distributed in the annular region of the throat of the complementary nozzle.

According to another specific embodiment the throat and divergent portions of the complementary nozzle can alternatively be replaced by a series of small contiguous ducts distributed in the annular zones of the throat and divergent portions of the complementary annular nozzle filled with a gas distribution torus.

The flow supply means for the complementary annular nozzle may utilize a functional of the rocket engine per se as a pressure source, the latter being in the form of a device for drawing off gases from a main combustion chamber of the rocket engine, or from a turbine exhaust region of the rocket engine, or the source may alternatively be a pressurized gas tank used by the rocket engine or again a flow of rocket propellant vaporized in the process of cooling a main nozzle of the rocket engine.

According to one embodiment, the gas flow supply means for the complementary annular nozzle is an autonomous gas source supplying the torus for distributing gas inside the annular convergent and divergent nozzle.

In the above embodiment, the self-contained gas source can be comprised of a powder block generator, or alternatively of an annular combustion chamber supplied by a rocket fuel injector, with the annular combusion chamber being itself included in torus for distributing gases in the complementary annular nozzle.

The complementary annular nozzle can be made dumpable by means of separation devices such as explosive fuses or explosive bolts that are activated by a pressure drop to below a predetermined threshold.

According to a specific embodiment of the present invention, the expansion nozzle is comprised of a second annular convergent and divergent nozzle of small vertical extent and having a shape that is substantially similar to that of the first complementary annular nozzle, and surrounding the latter for flow effect reinforcement by creating a flow at a static pressure Ps of said annular gas flow exhausted by said first complementary annular nozzle. By bringing the Summerfield criterion into play a second time, the above second annular nozzle reinforces the effect of the first complementary nozzle.

Various materials may be used for the manufacture of the complementary annular nozzle.

According to a first method of construction, the main external wall of the expansion nozzle forms part of the internal wall of the complementary annular nozzle while the external wall of the complementary annular nozzle is formed by a profiled surface of revolution affixed to the main external wall of the expansion nozzle.

According to a second method of construction, the complementary annular nozzle is formed by profiled element of revolution affixed to the lower end of the main wall of the nozzle.

According to a third method of construction, the complementary annular nozzle is formed by a profiled element that is independent of the main wall and is mounted at the level of the exhaust plane of the expansion nozzle.

In the above case, the mount between the complementary annular nozzle and the main wall of the expansion nozzle has a reinforcement comprised of fixing legs connecting the gas distribution torus to the main wall of the expansion nozzle.

The complementary annular nozzles can be made of metal or composite materials.

BRIEF DESCRIPTION OF THE DRAWINGS

Other characteristics and advantages of the present invention will be understood from the following description of embodiments given strictly by way of example with reference to the appended drawings in which:

FIG. 1 is a schematic axial cross-sectioned view of an expansion thrust nozzle for a rocket engine equipped with a complementary annular nozzle according to the present invention, FIGS. 2 to 5 are axial cross-sectional views of specific embodiments of metallic complementary annular nozzles depicting various possible configurations, FIG. 9 is a schematic axial cross-sectional view of an exemplary complementary annular nozzle equipped with a perforated annular plate at the level of its throat portion, FIG. 9A is a front view of part of the perforated annular plate incorporated in the complementary annular nozzle of FIG. 9, FIG. 10 is a schematic axial cross-sectional view of an exemplary complementary annular nozzle in which the throat and divergent portions are replaced by a series of small contiguous nozzles distributed along the collector of the complementary annular nozzle.

FIG. 12 is an axial cross-sectional view of a specific embodiment of the invention in which the gas flow applied to the complementary annular nozzle is produced by an autonomous gas source located in the vicinity of the torus for distributing gases inside the annular nozzle.

DESCRIPTION OF THE PREFERRED EMBODIMENTS

Figure 6:
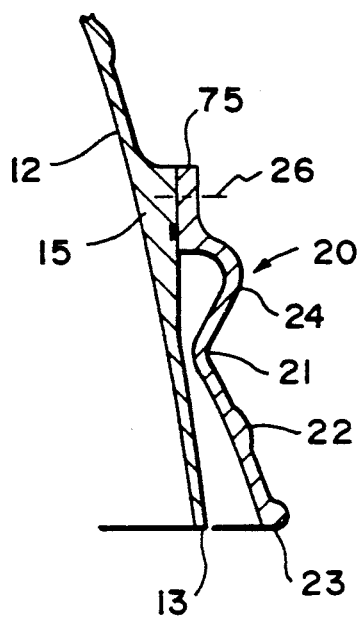
FIGS. 6 to 8 are half axial cross-sectional views of specific embodiments of composite material complementary annular nozzles depicting various possible configurations.

FIG. 1 gives a schematic view of an expansion throat nozzle 10 for a rocket engine. The expansion nozzle comprises a main wall 12 defining a surface of revolution that splays outwardly between a nozzle throat 11 and a downstream exhaust section 13 of the nozzle.

As has already been explained above, known rocket engine expansion nozzles operating at ground level have flow section ratios that are limited by burble phenomena.

The burble-free condition (Summerfield criterion) which is generally adopted for setting the relative dimensions of the expansion nozzle having to operate at ground level is expressed by: Pe/Pa <0.3 or 0.4, where Pe is the wall pressure produced by the flow of gases 1 emitted at the exhaust portion 13 of the expansion nozzle, and Pa is the ambientent pressure.

To satisfy the above condition, it is necessary to restrict the exhaust flow section of the expansion nozzle, i.e. have limited pressure drops, which leads to relatively poor performance at altitudes.

According to the present invention, the above drawback is solved by adjoining to the main nozzle 10 a complementary annular convergent-divergent nozzle 20 which has the same axis as the main nozzle 10, is placed outside the latter, in the region of the downstream extremity 13 of the expansion nozzle, and is arranged to produce an annular flow of gas 2 surrounding that of the main expansion nozzle and oriented along approximately the same direction.

The annular nozzle 20 is designed so as to deliver at its exhaust port 23 a flow of a gas having a static pressure Ps that is lower than the ambient pressure surrounding the main gas flow 1 and thus creates an interface to the latter having a pressure that is lower than ambient pressure Pa. The annular peripheral nozzle 20 can thus deliver a gas jet 2 at an intermediate static pressure e.g. equal to 0.4 bar, i.e. lower than ambient pressure, which is on the order of 1 bar at ground level, but allowing a reduction in the pressure Pe of the gas jet 1 on the wall of the exhaust port 13 of the main nozzle by around 60% with respect to the pressure value Ps. The pressure Pe, which would have to be on the order of 0.4 bar without the presence of the complementary annular nozzle 20, can be brought down to a value on the order of 0.16 bar when the complementary annular nozzle 20 is well used, which allows a considerable increase in the pressure drop in the main nozzle 10, and hence an improvement in specific impulse in space conditions.

The complementary annular nozzle 20 comprises a gas distribution torus 24 which cooperates with gas supply means 25 and is prolonged at its lower part by a shrunken portion serving as a flow converger for the complementary annular nozzle 20.

The gases injected into the annular nozzle via conduit 25 can come directly from the rocket engine, e.g. in the form of a dump flow of propellant for cooling the wall of the main nozzle, or a gas flow drawn from the rocket engine's main combustion chamber, or a flow of exhaust gases from turbines classically associated to the rocket engine, or again a flow of gases from a pressurized gas tank.

Alternatively, gas to be injected into the annular nozzle 20 can also come from other sources located close to the nozzle, as shall be explained further with reference to FIG. 12.

The flow of gas into the annular nozzle 20 and the geometrical configuration of the latter are made such that the annular gas flow exhausted from the nozzle 20 produces a static pressure Ps that is substantially lower than ambient pressure Pa, having a value of between 0.3 and 0.8 times ambient pressure.

Gas injection into the annular chamber can be continuous (from ignition to shut-down of the rocket engine) or it is interrupted when the ambient pressure at a given altitude allows the burble-free operation of the nozzle without having recourse to the annular nozzle.

In the latter case, the annular nozzle 20 can be dumpable, with means being provided for causing the annular nozzle 20 to separate from the main nozzle 10 when the external pressure has fallen below a givne threshold. the separation means may consist of standard explosive fuses or explosive bolts 26, 126, 46 (FIGS. 2 and 8 and FIGS. 11, 12) located around the connection between the complementary annular nozzle 20, 120, 40 and the structure of the main nozzle.

The complementary annular nozzle 20, 120, 40 can be metallic or made from composite materials.

FIGS. 2 to 5, 9, 10 and 12 show embodiments of metallic complementary nozzles while FIGS. 6 to 8 and 11 are examples of complementary nozzles made from composite materials.

According to a first embodiment (FIGS. 1 to 3 and 6 to 11) the external lateral wall 12 of the main nozzle forms part of the internal wall of the complementary annular nozzle 20 while the external wall of the complementary annular nozzle 20 is formed by a profiled surface of revolution affixed directly, or via a spacer 27, to the external wall of the main nozzle.

Figure 8:
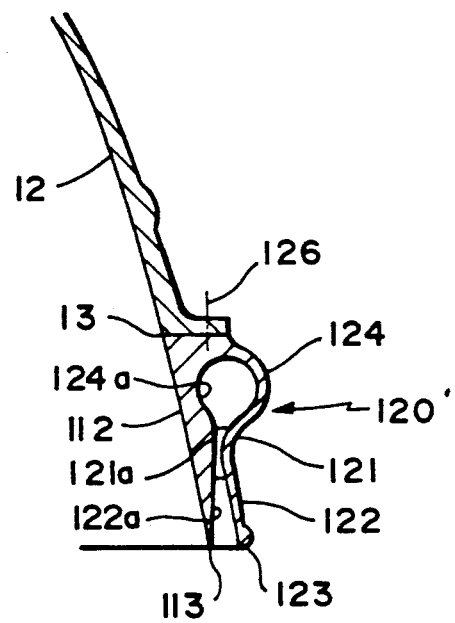
Figure 7:
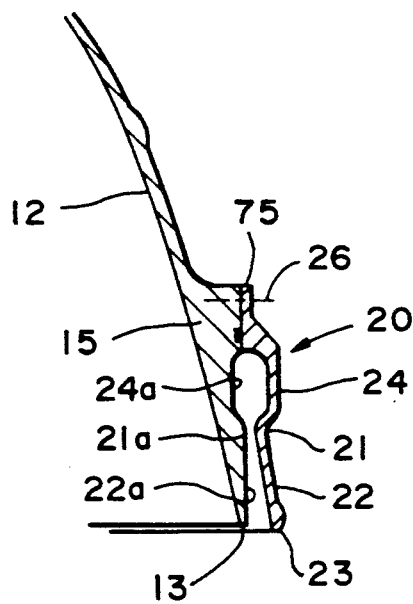

According to another embodiment shown in FIGS. 4 and 8, the complementary annular nozzle 120 is formed by a profiled element mounted at the level of the exhaust portion of the main nozzle and defining by its internal portion a downward projection of the main wall of the nozzle, with a new exhaust plane 113, and a complementary annular nozzle 120 that is analogous to the above-described complementary annular nozzle 20 and comprising a gas distribution torus 124, a complementary nozzle throat section 121 and a complementary nozzle divergent element 122 having an exhaust plane 123. The above elements 121 to 124 can be quite similar to elements 21 to 24 defining a complementary annular nozzle 20 in combination with the lower portion of the main nozzle wall.

As depicted in FIGS. 5 and 12, the complementary annular nozzle can also be formed as a component part that is completely independent from the main nozzle, and simply attached to the external lateral wall 12 of the main nozzle at the level of the exhaust plane 13 of the latter nozzle or, alternatively by legs 47 joining the gas distribution torus 44 to the lateral wall 12 of the main nozzle. In FIGS. 5 and 12, reference numeral 46 designates the joining elements, which can be explosive bolts to enable the complementary nozzle 40 to be dumped when the latter is no longer required, owing to a drop in ambient pressure. However, it can be envisaged to provide standard connections by means of welding or coupling flanges. In FIGS. 5 and 12, elements designated by reference numerals 41 to 44 correspond to elements designated by reference numerals 21 to 24 in FIG. 2.

The exhaust plane 23, 123, 43 of the complementary annular nozzle 20, 120, 40 cooperating with the main nozzle can be made such that the outside extremity of the annular nozzle is either at the same level (FIG. 2) or projecting (FIGS. 3 and 4) with respect to either the extremity 13, 113 of the main nozzle wall 12, or an extension 112 of that wall 12.

FIG. 4 shows a specific embodiment in which the lower extremity 123 of the external wall of the complementary annular nozzle 120 can be prolonged by an inwardly curved, concave deflector 128.

The complementary annular nozzle 20, 120 can have a symmetrical or near-symmetrical axial cross-section (FIGS. 7, 8) with an internal partitioning wall forming the lower part of the lateral wall 12 of the main nozzle, or an extension 112 to that partitioning wall, and further have a smooth first face and a profiled second face 24a, 21a, 22a and 124a, 121a, 122a respectively partially defining the complementary annular nozzle 20, 120. However, the above configuration is not essential, and the internal wall of the complementary nozzle 20, 120 can have a regular curve (FIGS. 2 to 4, 6 and 9 to 11).

Figure 11:
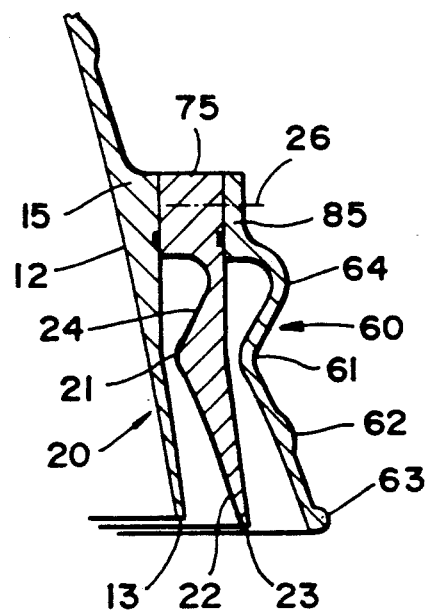
FIG. 11 is an axial cross-sectional view of a specific embodiment of the invention in which two complementary annular and coaxial nozzles surround the downstream portion of the expansion thrust nozzle of the rocket engine.

A second complementary annular nozzle 60, which is similar to and works in the same way as the first complementary nozzle 20, 120, 40, can be provided for an enhanced effect. FIG. 11 shows the implementation of two axial and concentric complementary nozzles 20, 60 in accordance with an embodiment that is similar to the one of FIG. 6, but a double complementary nozzle can also be implemented in accordance with the embodiments depicted in other figures.

In FIG. 11, the second complementary nozzle 60 is fitted with a coupling flange 85 that bears against the coupling flange 75 of the first complementary nozzle 20, which is itself pressed against a strengthened portion 15 of the main wall of the main expansion nozzle. The profiled element that defines the second complementary nozzle 60 determines—with the profiled element defining the first complementary nozzle—a gas distribution torus 64, a sonic throat 61, a diverging element 62, and an exhaust section 63, all of which are analogous to the corresponding elements 24, 21, 22, 23 of the first complementary nozzle 20. In the embodiment of FIG. 11, it is now the static pressure Pi at the exhaust of the second complementary nozzle 60 which should have a value of between 0.3 and 0.8 times ambient pressure Pa, while the static pressure Ps at the exhaust 23 of the first complementary nozzle 20 itself has a value of between 0.3 and 0.8 times the static pressure Pi at the exhaust 63 of the second complementary nozzle 60.

The gas distribution torus 24, 44, 124 and 64 is prolonged at its lower portion by a shrunken portion serving as a converger for the complementary annular nozzle 20, 40, 120, 60 and comprising a sonic throat 21, 41, 121 and 61. For a more uniform gas distribution, the torus 124 can be fitted with internal perforated partitions 129 comprising a succession of holes 131 (FIG. 4).

According to a specific embodiment illustrated in FIGS. 9 and 9A, the annular throat 21 of the complementary nozzle 20 is closed by an annular perforated plate 30 comprising a succession of holes, instead of having a continuous opening. The plate 30 serves both to maintain the throat's flow section at the desired value despite expansion effects and to improve gas distribution uniformity.

FIG. 10 illustrates another specific embodiment having a similar object as that of FIG. 9, in which the annular throat 21 and annular diverging element 22 of the complementary nozzle 20 are replaced by a set of small contiguous nozzles 220 distributed around the perimeter of the lower extremity 13 of the main wall of the main nozzle 10. Each small individual nozzle 220 is itself provided with an input port 22 that is similar to the holes 31 of the perforated plate 30, forming a sonic throat, and a diverging port 222 that is terminated by an exhaust port 223 that can be projecting with respect to exhaust section of the main expansion nozzle.

FIG. 12 shows an embodiment which is similar to that of FIG. 5, but in which the complementary annular nozzle 40 is not fed by a flow of gas coming from sources that are directly connected with the rocket itself, but instead by a flow of gas fed by duct 45 into the distribution torus 44 from an auxiliary and autonomous gas generator 50 located in the region of the torus 44. The autonomous gas source can be in the form of powder block type gas generator, or an annular combustion chamber fed by a propellant injector. In the latter case, the annular combustion chamber 50 of FIG. 12 can be contained within the gas distribution torus 44, thereby not forming an element that is juxtaposed to the nozzle 40.

Naturally, the above-described elements can be combined among themselves. For instance, the use of a self-contained gas source 50 is not limited to an embodiment involving the use of a complementary nozzle 40, such as described in FIG. 5, but can also apply to the other embodiments depicted in the figures.

What is claimed is:

1. An expansion nozzle for a rocket engine destined to function successively in atmospheric and space conditions, comprising a main wall defining a surface of revolution that splays outwardly between a nozzle throat and a downstream extremity of said expansion nozzle, wherein said expansion nozzle further comprises a complementary annular convergent and divergent nozzle of small vertical extent having an exhaust port as well as an axis coinciding with a principal axis of said main wall, said complementary annular nozzle along with the exhaust port being located outside said main wall in the region of said downstream extremity of said expansion nozzle and having a gas distribution torus cooperating with gas flow supply means to produce an annular flow of gas exhausted from the diverging part of said complementary annular nozzle, said annular flow of gas surrounding a main flow of gas exhausted at said downstream extremity of said main wall of said expansion nozzle and forming a source of static pressure Ps that is substantially lower than atmospheric pressure Pa and Ps having a value of between 0.3 and 0.8 times atmospheric pressure Pa.

2. An expansion nozzle as claimed in claim 1, wherein a portion of said gas distribution torus conforms with a portion of the complementary nozzle and defines a narrowed flow section serving as a converger for said complementary annular nozzle.

3. An expansion nozzle as claimed in claim 1, wherein a downstream extremity of an external wall of said complementary annular nozzle forms a generally concave deflector whose concavity faces away from the axis of the complementary annular nozzle.

4. An expansion nozzle as claimed in claim 1, wherein said gas distribution torus has internal partitions for improving gas distribution uniformity.

5. An expansion nozzle as claimed in claim 1, wherein said complementary annular nozzle has a throat portion that is closed by a plate that is provided with a succession of holes distributed in the annular region of said throat of said complementary nozzle.

6. An expansion nozzle as claimed in claim 1, wherein said gas flow supply means for said complementary annular nozzle utilizes a functional part of said rocket engine as a pressure source, said source being comprised of means for drawing off gases from a main combustion chamber of said rocket engine.

7. An expansion nozzle as claimed in claim 1, wherein said gas flow supply means for said complementary annular nozzle utilizes a functional part of said rocket engine as a pressure source, said source being comprised of means for drawing off gases from a turbine exhaust region of said rocket engine.

8. An expansion nozzle as claimed in claim 1, wherein said gas flow supply means for said complementary annular nozzle utilizes a functional part of said rocket engine as a pressure source, said source being comprised of a pressurized gas tank.

9. An expansion nozzle as claimed in claim 1, wherein said gas flow supply means for said complementary annular nozzle utilizes a functional part of said rocket engine as a pressure source, said source being comprised of a flow of rocket propellant vaporized in the process of cooling a main nozzle of said rocket engine.

10. An expansion nozzle as claimed in claim 1, wherein said, gas flow supply means for said complementary annular nozzle comprises an autonomous gas source supplying said torus for distributing gas inside the complementary annular convergent and divergent nozzle.

11. An expansion nozzle as claimed in claim 10, wherein said autonomous gas source is comprised of a powder block gas generator.

12. An expansion nozzle as claimed in claim 10, wherein said autonomous gas source is comprised of an annular combustion chamber supplied by a rocket fuel injector.

13. An expansion nozzle as claimed in claim 12, wherein said annular combustion chamber is included within said torus for distributing gas in said complementary annular chamber.

14. An expansion nozzle as claimed in claim 1, wherein said complementary annular nozzle is removably attached to said main wall by means of separation devices, said separation devices being comprised of an explosive fuse activated by a pressure drop to below a predetermined threshold.

15. An expansion nozzle as claimed in claim 1, wherein said complementary annular nozzle is removably attached to said main wall by means of separation devices, said separation devices being comprised of explosive bolts activated by a pressure drop to below a predetermined threshold.

16. An expansion nozzle as claimed in claim 1, wherein said expansion nozzle, further comprises a second annular convergent and divergent nozzle of small vertical extent and having a shape that is substantially similar to that of said first complementary annular nozzle and surrounding the latter, for flow effect reinforcement by creating a flow at a static pressure Pi that is lower than atmpheric pressure and greater than said static pressure Ps of said annular gas flow exhausted by said first complementary annular nozzle.

17. An expansion nozzle as claimed in claim 1, wherein said main wall of said expansion nozzle forms part of the inner wall of said complementary annular nozzle and wherein an external wall of said complementary annular nozzle is comprised of a profiled surface of revolution affixed to said main wall of said expansion nozzle.

18. An expansion nozzle as claimed in claim 1, wherein said complementary annular nozzle is comprised of a profiled surface of revolution affixed to a downstream portion of said main wall of said expansion nozzle and forms an extending projection of said main wall of said expansion nozzle.

19. An expansion nozzle as claimed in claim 1, wherein said complementary annular nozzle is comprised of a profiled element that is independent from the main wall of said expansion nozzle, surrounds the lower part of said main wall and is mounted at the level of the exhaust plane of said expansion nozzle.

20. An expansion nozzle as claimed in claim 19, wherein said mount between said complementary annular nozzle and said main wall of said expansion nozzle has a reinforcement comprised of fixing legs connecting said gas distribution torus to said main wall of said expansion nozzle.

21. An expansion nozzle as claimed in claim 1, wherein said complementary annular nozzle is metallic.

22. An expansion nozzle as claimed in claim 1, wherein said complementary annular nozzle is made up of a composite material.

23. An expansion nozzle for a rocket engine destined to function successively in atmospheric and space conditions, comprised of a main wall defining a surface of revolution that splays outwardly between a nozzle throat and a downstream extremity of said expansion nozzle, wherein said expansion nozzle is further comprised of a complementary flow channel means of small vertical extent having an exhaust port as well as an axis coinciding with the principal axis of said main wall, said flow channel means along with an exhaust port being located outside said main wall, in the region of said downstream extremity of said expansion nozzle and being comprised of a convergent nozzle in flow communication with downstream divergent flow means, said divergent flow means being comprised of small contiguous nozzles distributed around a throat section defined by said main wall and the downstream portion of said divergent nozzle, located outside said main wall in the region of said downstream extremity, said flow channel means further being comprised of a gas distribution torus cooperating with gas flow supply means to produce an annular flow of gas exhausted from said divergent flow means of said complementary flow channel means, said annular flow of gas surrounding a main flow of gas exhausted at said downstream extremity of said main wall of said expansion nozzle and forming a source of static pressure Ps that is substantially lower than atmospheric pressure Pa and having a value of between 0.3 and 0.8 times atmospheric pressure Pa.

24. An expansion nozzle as claimed in claim 23, wherein said gas flow supply means for said complementary flow channel means utilizes a functional part of said rocket engine as a pressure source, said source being comprised of means for drawing off gases from a main combustion chamber of said rocket engine.

25. An expansion nozzle as claimed in claim 23, wherein said gas flow supply means for said complementary flow channel means utilizes a functional part of said rocket engine as a pressure source, said source being comprised of means for drawing off gases from a turbine exhaust region of said rocket engine.

26. An expansion nozzle as claimed in claim 23, wherein said gas flow supply means for said complementary flow channel means utilizes a functional part of said rocket engine as a pressure source, said source being comprised of a pressurized gas tank.

27. An expansion nozzle as claimed in claim 23, wherein said gas flow supply means for said complementary flow channel means utilizes a functional part of said rocket engine as a pressure source, said source being a flow of rocket propellant vaporized in the process of cooling of a main nozzle of said rocket engine.

28. An expansion nozzle as claimed in claim 23, wherein said gas flow supply means for said complementary flow channel means comprises an autonomous gas source supplying said torus for distributing gas inside said flow channel means.

29. An expansion nozzle as claimed in claim 28, wherein said autonomous gas source is comprised of a powder block gas generator.

30. An expansion nozzle as claimed in claim 28, wherein said autonomous gas source is comprised of an annular combustion chamber supplied by a rocket fuel injector.

* * * * *